April 16, 1968   C. A. EAVES ET AL   3,378,759

TRANSFORMER VOLTAGE REGULATING SYSTEM

Filed June 29, 1965

WITNESSES:

INVENTORS
Charles A. Eaves, Rodney L. Peckham
and Ralph A. Prunty.
BY

ATTORNEY

# United States Patent Office 3,378,759
Patented Apr. 16, 1968

3,378,759
TRANSFORMER VOLTAGE REGULATING SYSTEM
Charles A. Eaves, Jamestown, Rodney L. Peckham, Transfer, and Ralph A. Prunty, Greensburg, Pa., assignors to Westinghouse Electric Corporation, Pittsburgh, Pa., a corporation of Pennsylvania
Filed June 29, 1965, Ser. No. 468,026
14 Claims. (Cl. 323—43.5)

ABSTRACT OF THE DISCLOSURE

A step voltage regulator adapted for connection to a source of alternating potential and to a load circuit. The step voltage regulator includes a transformer, a relay connected to provide a first transformer output voltage when deenergized, and a second transformer output voltage when energized, and a trigger circuit adapted to be responsive to the magnitude of the source of alternating potential. The trigger circuit energizes and deenergizes the relay at substantially the same magnitude of the source of alternating potential.

---

Figure 1:
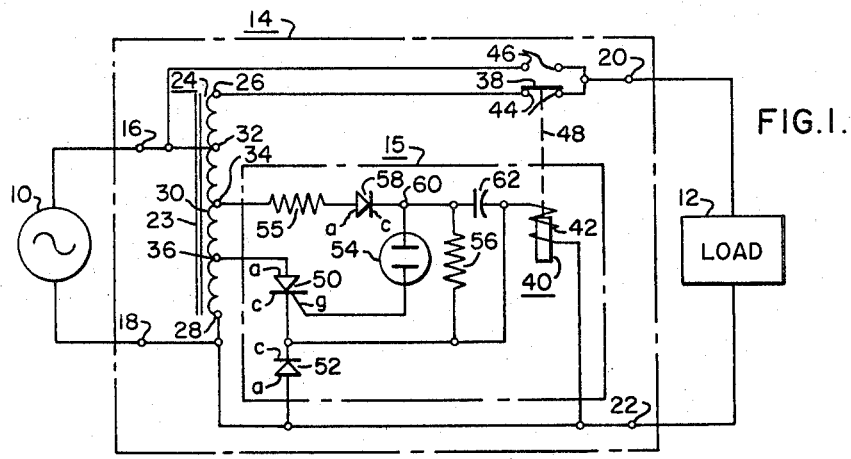

Household line voltage regulation is very poor in many areas of the world, making it necessary that some type of automatic voltage regulator be used in conjunction with certain household appliances. The voltage regulator must be accurate and reliable, and these characteristics must be obtained at a relatively low cost. Accurate and reliable voltage regulator systems are readily available on the market, but unfortunately their cost, when compared with the cost of the household appliance they are to be associated with, is usually prohibitive. From a cost standpoint, a desirable form of voltage regulator for this application would be a step-type regulator comprising an autotransformer and a voltage sensitive relay, with the voltage sensitive relay switching taps on the autotransformer in response to predetermined line voltage conditions. This arrangement is not readily adaptable to practice, however, due to the fact that voltage sensitive relays do not pick-up and drop-out at substantially the same voltage levels. Attempts to develop circuitry associated with conventional voltage sensitive relays to pick-up and drop-out the relay at substantially the same voltage magnitudes have either met with indifferent success, or they have been too complicated and costly for the application of regulating the voltage applied to household appliances.

Accordingly, it is an object of the invention to provide a new and improved voltage regulator system.

Another object of the invention is to provide a new and improved low cost voltage regulator system which is accurate, reliable and suitable for regulating the voltage of household appliances.

A further object of the invention is to provide a new and improved low cost, step voltage regulator system which will pick-up and drop-out a voltage sensitive relay at substantially the same voltage magnitude, to switch taps on transformer means.

Briefly, the present invention accomplishes the above-cited objects by utilizing transformer means, and first, second and third switching means. The first switching means is responsive to the positive half cycle of voltage in the transformer means, and has the characteristic of switching from a nonconductive to a conductive state when the voltage applied thereto exceeds a predetermined magnitude. The second switching means switches from a nonconductive to a conductive state in response to the switching of the first switching means, and remains conductive until the end of the positive voltage half cycle. The third switching means is connected to first and second predetermined taps on the transformer means, and is connected to the first predetermined tap when energized and to a second predetermined tap when deenergized. The third switching means is responsive to the switching of the second switching means, with the third switching means remaining energized for a complete voltage cycle each time the second switching means becomes conductive during a positive voltage half cycle.

One embodiment of the invention utilizes an autotransformer, with a conventional voltage sensitive relay being utilized as the third switching means, to switch taps on the autotransformer. The relay is energized by the second switching means, which may be a controlled rectifier, whose conduction is controlled by the first switching means, which may be a neon glow lamp. When a predetermined line voltage is reached, the neon glow lamp conducts, turning the controlled rectifier on once each positive voltage half cycle and energizing the relay for a complete voltage cycle. When the line voltage drops below the predetermined voltage, the neon glow lamp ceases to conduct, the controlled rectifier is not turned on, and the relay is deenergized. Thus, the relay pick-up and drop-out points are controlled by the ignition voltage of the neon glow lamp, and the particular pick-up and drop-out characteristics of the relay itself are not critical.

Further objects and advantages of the invention will become apparent as the following description proceeds and features of novelty which characterize the invention will be pointed out in particularity in the claims annexed to and forming a part of this specification.

Figure 2:
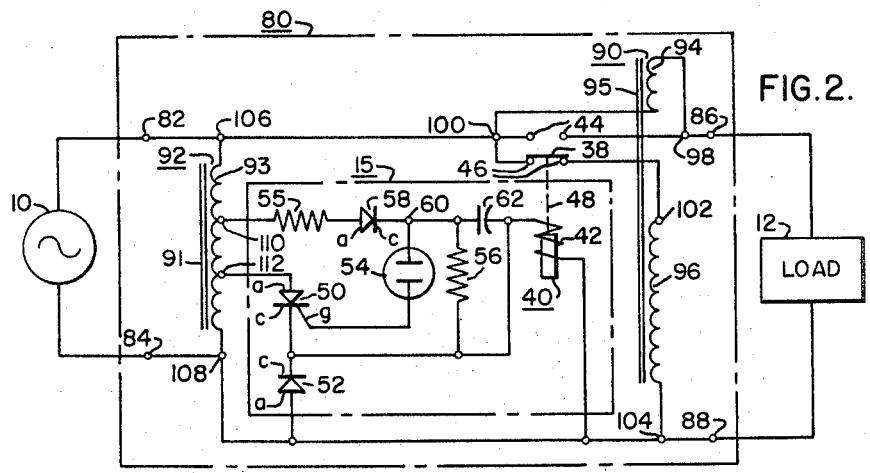

For a better understanding of the invention, reference may be had to the following detailed description, taken in connection with the accompanying drawings, in which:

FIGURE 1 is a schematic diagram illustrating an embodiment of the invention; and FIG. 2 is a schematic diagram illustrating another embodiment of the invention.

Referring now to FIG. 1, there is shown a source 10 of alternating potential connected to a load circuit 12, through a voltage regulator system 14. The source 10 of alternating potential represents the line voltage to be applied to a household electrical appliance, whose voltage is to be regulated, and the load 12, shown in block form, represents the electrical appliance. In many areas of the world, household line voltages may fluctuate widely, making it essential that the voltage applied to certain household appliances such as air-conditioning units, be regulated. The voltage regulator should be easy and inexpensive to maintain, accurate, reliable, and have a low initial cost.

In general, voltage regulator 14 has input terminals 16 and 18 for connection to the source 10 of alternating potential, and output terminals 20 and 22 for connection to the load circuit 12. Voltage regulartor 14 includes a trigger circuit 15 and a power autotransformer 24. Autotransformer 24 has a winding 30 disposed in inductive relation with a magnetic core 23, terminals 26 and 28 disposed on the ends of winding 30, and a plurality of intermediate terminals or taps 32, 34, and 36, connected to predetermined turns of winding 30. Input terminals 16 and 18 are connected to the autotransformer terminals 32 and 28, respectively. Output terminal 22 is connected to terminal 28 on autotransformer winding 30, and output terminal 20 is connected to the stationary contacts 44 and 46 of a voltage sensitive relay 40, which is a part of trigger circuit 15.

Voltage sensitive relay 40 includes an electromagnetic coil 42, stationary contacts 44 and 46, and movable contact 38. The position of movable contact 38 is responsive to the electrical coil 42, as indicated by the dotted line 48 in FIG. 1, with movable contact 38 making electrical contact with stationary contacts 44 when the electromagnetic coil 40 is deenergized, and switching to make electrical contact with stationary contacts 46 when the electromagnetic coil 42 is energized. Stationary contacts 44 of relay 40 are connected between terminal 26 of autotransformer winding 30 and output terminal 20, and stationary contacts 46 of relay 40 are connected between tap 32 of autotransformer winding 30 and output terminal 20. Tap 32 of autotranformer winding 30 may be connected to the input terminal 16, if a one-to-one ratio is desired, or input terminal 16 and stationary contact 46 may be connected to any predetermined tap, depending upon the turns ratio desired.

The input voltage from source 10 is applied across a portion of the autotransformer winding 30, from terminal 28 to tap 32. The output voltage appearing at output terminals 20 and 22 will be either the voltage across terminals 26 and 28 of autotransformer winding 30, when relay 40 is deenergized, or the voltage across terminals 28 and 32 when relay 40 is energized. Thus, when the input voltage is of sufficient magnitude for proper operation of the load circuit 12, relay 40 will be energized, connecting the input terminals 16 and 18 to the output terminals 20 and 22. When the input voltage is below a predetermined magnitude, the relay 40 will be deenergized, connecting the output terminals across autotransformer winding 30. The amount that the voltage is boosted from tap 32 to terminal 26 of autotransformer winding 30 is determined by the voltage regulation characteristics of the source 10, and the minimum and maximum desirable operating voltages of the load circuit 12.

In order for the step regulator 14 to function in the desired manner, the voltage sensitive relay 40 must pickup and drop-out at substantially the same voltage magnitude. Since conventional voltage sensitive relays do not pick-up and drop-out at substantially the same voltage magnitudes, some means must be incorporated which will energize or trigger the relay at a predetermined voltage magnitude, and remove the energization from the relay when the voltage drops below the predetermined magnitude. This triggering function is accomplished by trigger circuit 15, in which the electromagnetic coil 42 of relay 40 is connected across a predetermined portion of autotransformer winding 30, through a controlled rectifier 50, which may be a silicon controlled rectifier having an anode electrode $a$, cathode electrode $c$, and a gate electrode $g$. Controlled rectifier 50 has its main electrodes, $a$ and $c$, serially connected with electromagnetic coil 42, of relay 40, with its anode electrode $a$ being connected to tap 36 an autotransformer winding 30, and its cathode electrode $c$ being connected to one end of electromagnetic coil 42. The remaining end of electromagnetic coil 42 is connected to termnal 28 on autotransformer winding 30. Tap 36 is selected to provide sufficient voltage to energize the relay 40 and cause its movable contact member 38 to move from stationary contacts 44 to stationary contacts 46. Controlled rectifier 50 prevents relay 40 from being energized until a signal is applied to its gate electrode $g$. Since controlled rectifier 50 is connected to an alternating potential, a gate or control signal will have to be applied to the gate electrode $g$ every positive half cycle, if the relay 40 is to remain energized. Controlled rectifier 50 will switch from its blocking state to a conductive state when an appropriate signal is applied to its gate electrode $g$ during the positive half cycle of source potential 10, and controlled rectifier 50 will conduct current until the voltage reverses polarity. When controlled rectifier 50 turns off, asymmetrically conductive device 52 provides a path for the current in relay winding 42. Thus, as long as control signals are applied to the gate electrode $g$ of controlled rectifier 50 each positive half cycle, relay 40 will be energized continuously. Asymmetrically conductive device 52 prevents relay 40 from dropping out during the negative half cycle and the portion of the positive half cycle that it is not energized, and thus prevents the relay from chattering. Asymmetrically conducting device 52 is connected across relay coil 42, and poled to allow the current in relay coil 42 to continue to flow during the portion of time controlled rectifier 50 is in its nonconductive state. Asymmetrically conducting device 52 may be a diode, having an anode electrode $a$ and a cathode electrode $c$, with its cathode electrode $c$ being connected to the same end of electromagnetic coil 42 as the cathode electrode $c$ of controlled rectifier 50.

In order to provide a control signal for controlled rectifier 50 when the line voltage across terminals 16 and 18 reaches a predetermined magnitude, and to cease supplying control signals when the line voltage drops below this predetermined magnitude, a glow discharge device 54, such as a neon glow lamp, is connected in circuit relation with the gate electrode $g$ of controlled rectifier 50. A glow discharge device is preferable because of its low cost. However, any switching means having the characteristic of allowing current flow above a predetermined voltage and blocking current flow below the predetermined voltage, such as unijunction transistors and Shockley diodes, may be used. In order to provide a unidirectional voltage to the glow discharge device 54 which will cause the glow discharge device 54 to become electrically conductive on only positive half cycles when the potential at tap 32 reaches a predetermined magnitude, voltage divider means and rectifier means are serially connected from tap 34 to the cathode electrode $c$ of controlled rectifier 50. The voltage divider means includes resistors 55 and 56, and the rectifier means may be a rectifier or diode 58, having an anode electrode $a$ and a cathode electrode $c$. The resistor 55 is connected to tap 34 on autotransformer winding 30, and the rectifier 58 is connected in the same half of the voltage divider as resistor 55, with its anode electrode $a$ being connected to the tap 34. Resistor 56 is connected to the serially connected resistor 55 and rectifier 58, and also to the cathode electrode $c$ of controlled rectifier 50. Glow discharge device 54 is connected to the midtap of the voltage divider means at terminal 60. Energy storage means, such as capacitor 62, is connected across resistor 56 in order to store energy which may be discharged through the glow discharge device 54 when it switches to its conductive state, and provide a current pulse to the gate electrode $g$ of controlled rectifier 50 sufficient to switch controlled rectifier 50 from its blocking to its conductive condition. Rectifier 58 prevents capacitor 62 from charging on negative half cycles of the supply voltage, and prevents glow discharge device 54 from conducting on negative half cycles, which would apply an undesirable negative pulse to the gate electrode of the controlled rectifier 50. The circuit constants are selected to provide a voltage across resistor 56 and capacitor 62, which will fire glow discharge device 54 when the voltage at tap 32 reaches a predetermined magnitude. If the inductance of relay coil 42 should prevent the current from building up rapidly enough through controlled rectifier 50 to switch it to its conductive condition, a resistor (not shown) may be connected across relay winding 42.

In operation, assume that the line voltage applied to input terminals 16 and 18 is below the desired magnitude. Relay 40 will be deenergized, and the output voltage at output terminals 20 and 22 will be the voltage appearing across terminals 26 and 28 of autotransformer winding 30, which is a predetermined percent higher than the input voltage. Now, assume that the input voltage applied to input terminals 16 and 18 increases to the magnitude which will provide a voltage across resistor 56 and capacitor 62 sufficient to ignite glow discharge device 54. Capacitor 62 will discharge through glow discharge device 54, causing controlled rectifier 50 to switch from its nonconductive state to its conductive state, which energizes relay 40. Relay 40 thus switches movable contact member 38 from stationary contacts 44 to stationary contacts 46, which drops the voltage applied to the output terminals 20 and 22 and to the load circuit 12 to the voltage magnitude appearing across taps 28 and 32 of autotransformer winding 30. When the output voltage drops, upon the switching of relay 40, the output current will also drop. When this happens the voltage at terminal 34 will rise slightly, due to the inherent regulation of the autotransformer 24. This action is important, as it "locks" the circuit into the new mode of operation, and prevents excessive switching of relay 40 which could otherwise occur should the line voltage fluctuate slightly about the predetermined transition voltage at which glow discharge device 54 is ignited. As long as the voltage at taps 32 and 34 of autotransformer winding 30 is above the predetermined transition point, the regulator 14 will be locked into the energized mode, with glow discharge device 54 igniting each positive half cycle and capacitor 62 discharging through glow discharge device 54 each positive half cycle to turn controlled rectifier 50 on each positive half cycle, thus continuously energizing relay 40. It should be noted that although glow discharge device 54 and controlled rectifier 50 are only in their conductive conditions for a portion of the overall voltage cycle, that the relay 40 will be energized for a period of time sufficient to prevent chattering of the relay's mechanical contacts when the controlled rectifier 50 is switched each voltage cycle. Thus, the current in relay coil 42 will be above its direct current latching value for a major portion of the voltage cycle, as a minimum, to several cycles as a practical maximum if the controlled rectifier 50 is not refired.

Now assume that the, voltage applied to input terminals 16 and 18 drops to the transition voltage at which the voltage across resistor 56 and capacitor 62 is insufficient to ignite glow discharge device 54. Controlled rectifier 50 will, thus, be no longer switched to its conductive state each positive half cycle, and relay 40 will drop out, causing the output terminal 20 to again be connected to the higher voltage at terminal 26. It may be from one to several cycles of voltage from the time the glow discharge 54 device senses "under" voltage before relay 40 will drop-out to increase the output voltage depending upon the period of time relay coil 42 is energized above its latching value when controlled rectifier 50 is switched.

As an example, assume that the normal line voltage is 207 volts, and that it may vary between 170 and 252 volts. Further assume, that the load circuit is an air-conditioning unit which should be operated between 207 and 252 volts. With the line voltage between 170 and 207 volts, relay 40 will be deenergized, and movable contact member 38 would be electrically in contact with stationary contacts 44. The amount of voltage boost would be selected to be 22%, which would give an output voltage in the range of 207 to 252 volts when the input voltage is between 170 and 207 volts. When the input voltage increases to 207 volts, the voltage across glow discharge device 54 will be sufficient to fire the device, and allow capacitor 62 to discharge through the glow discharge device 54 and apply a control signal to the controlled rectifier 50, which switches controlled rectifier 50 from its nonconductive to its conductive state. Relay 40 will be energized, and the output terminal 20 will be connected to tap 32 on the autotransformer 24. The output voltage thus drops to 207 volts. The output current also drops, and the inherent voltage regulation of autotransformer 24 causes the output voltage to rise slightly above 207 volts, and the voltage applied to tap 34 also increases slightly, locking the voltage regulator 14 into its energized mode. The relay 40 will be energized at line voltages between 207 and 252 volts. Should the line voltage drop below 207 volts, the glow discharge device will not fire on the next positive voltage half cycle, and will cease supplying firing pulses to controlled rectifier 50 each positive half cycle. Thus, relay 40 will be deenergized when the current in relay coil 42 drops below its latching magnitude, and the output voltage will be boosted back into the desired range between 207 and 252 volts.

FIG. 1 illustrates an embodiment of the invention wherein the secondary circuit of transformer 24 is switched. Certain additional economies may be realized, especially on larger voltage regulators, if the primary circuit of the transformer is switched instead of the secondary circuit, even though this arrangement necessitates a separate small control transformer to power the triggering circuit 15. By switching the primary circuit of the transformer, a less expensive relay having a lower power rating may be utilized, as the high inductive surges generated when the current to the load is interrupted, are diverted through the secondary winding of the main or power transformer. Further, when the primary circuit is switched, the transformer is completely deenergized above the switch point, allowing the size and cost of the power transformer to be reduced. The magnetic core of the power transformer may be operated at maximum induction at the switch point, rather than at the maximum voltage point. FIG. 2 illustrates the modifications to the embodiment of FIG. 1, required to switch the primary circuit, instead of the secondary circuit, with like reference numerals in FIGS. 1 and 2 indicating like components.

FIG. 2 illustrates the source 10 of alternating potential connected to the load circuit 12 through a voltage regulator system 80. As described relative to FIG. 1, the source 10 represents the line voltage to be regulated, and the load circuit 12 represents the electrical household appliance.

In general, voltage regulator 80 has input terminals 82 and 84 adapted for connection to the source 10 of alternating potential, and output terminals 86 and 88 adapted for connection to the load circuit 12. Voltage regulator 80 includes a trigger circuit 15, similar to the trigger circuit 15 described relative to FIG. 1, a power transformer 90, and a control autotransformer 92. Power transformer 90 has first and second winding portions 94 and 96, respectively, disposed in inductive relation with a magnetic core 95, with winding portion 94 having terminals 98 and 100, and winding portion 96 having terminals 102 and 104. Control autotransformer 92 has a winding portion 93 disposed in inductive relation with a magnetic core 91, with terminals 106 and 108, as well as tap connections 110 and 112, being disposed on winding portion 93. Relay 40 has its stationary contacts 44 connected to terminals 98 and 100 across winding portion 94, and its stationary contacts 46 connected to terminal 102 of winding portion 96 and terminal 100. When relay 40 is deenergized, movable contact 38 is in the position shown in FIG. 2, electrically connecting terminal 100 of winding portion 94 with terminal 102 of winding portion 96. Thus, the input terminal 82 is connected between winding portions 94 and 96, and the output voltage applied to output terminals 86 and 88 is greater than the input voltage by the magnitude of voltage across winding portion 94. When relay 40 is energized, movable contact 38 will switch, breaking contact with its stationary contacts 46 and making contact with stationary contacts 44. Thus, the voltage appearing at the output terminals 86 and 88 is the same as that appearing at the input terminals 82 and 84.

Trigger circuit 15 operates relay 40 in the same manner as described relative to FIG. 1, with trigger circuit 15 obtaining the potential for firing glow discharge device 54 from tap 110 on control autotransformer 92, and the potential for energizing coil 42 of relay 40 from tap 112 on control autotransformer 92. It will be noted that when relay 40 switches its movable contact 38 from stationary contacts 46 to stationary contacts 44, that the inductive surge generated when the load current is interrupted is diverted through the winding portion 94 of transformer 90. It should also be noted that when the movable contact 38 of relay 40 is in contact with stationary contacts 44, that winding portion 96 of the transformer 90 is completely removed from the circuit. The only time that winding portion 96 is in the circuit is when winding portion 94 is also in the circuit, thus winding portion 96 is never called upon to furnish the complete load requirements and it may consequently be reduced in size, with a corresponding reduction in its cost. This arrangement further allows the magnetic core 95 to be operated at maximum induction at the switch point, rather than at the maximum voltage point.

Although the embodiments of the invention illustrated in FIGS. 1 and 2 show the output being connected between two taps on the transformer or autotransformer winding, it will be understood that multiple versions of the arrangements shown in FIGS. 1 and 2 may be utilized to actuate more than one tap change if required for a particular application. It will also be understood that while one embodiment of the invention has been illustrated with an autotransformer, that a transformer having isolated primary and secondary windings will be equally suitable.

In summary, there has been disclosed a new and improved step-type voltage regulator, in which a relay is picked-up and dropped-out at substantially the same value of line potential, which switches taps on a transformer to keep the output voltage within a predetermined desired range. The regulator is accurate within its intended range, reliable, easy to maintain, and utilizes inexpensive components which enables it to be utilized economically with home appliances.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. A voltage regulator comprising, input terminals adapted for connection to a source of alternating potential; output terminals adapted for connection to a load circuit; transformer means connected in circuit relation with said input and output terminals; first switching means having a first position when deenergized and switching to a second position when energized; said first switching means being connected to change the circuit connection of said transformer means relative to said output terminals when said first switching means switches from one of its positions to the other; trigger means for energizing said first switching means when an alternating potential applied to said input terminals exceeds a predetermined magnitude, and for deenergizing said first switching means when an alternating potential applied to said input terminals drops below substantially the same predetermined magnitude; said trigger means including second and third switching means; said second switching means having the characteristic of allowing electrical conduction above a predetermined potential; said third switching means having the characteristic of allowing electrical conduction during a positive half cycle of the alternating potential source when a control signal is applied thereto; said second switching means being connected in circuit relation with said third switching means and being responsive to an alternating potential applied to said input terminals to apply a control signal to said third switching means when an alternating potential applied to said input terminals exceeds a predetermined magnitude; said third switching means being connected in circuit relation with said transformer means and said first switching means to energize said first switching means when said third switching means allows electrical conduction in response to a control signal from said second switching means; said first switching means being continuously energized when said third switching means allows electrical conduction each positive half cycle of the alternating potential applied to said input terminals.

2. A voltage regulator comprising, input terminals adapted for connection to a source of alternating potential; output terminals adapted for connection to a load circuit; transformer means connected in circuit relation with said input and output terminals; first switching means having a first position when deenergized and switching to a second position when energized; said first switching means being connected to change the circuit connection of said transformer means relative to said output terminals when said first switching means switches from one of its positions to the other; trigger means for energizing said first switching means when an alternating potential is applied to said input terminals which exceeds a predetermined magnitude, and for deenergizing said first switching means when an alternating potential is applied to said input terminals which drops below substantially the same predetermined magnitude; said trigger means including second and third switching means; said second switching means having the characteristic of switching from a nonconductive state to a conductive state when subjected to an electrical potential of predetermined magnitude; said third switching means having the characteristic of switching from a nonconductive state to a conductive state during a positive half cycle of an alternating potential when a control signal is applied thereto; said second switching means being connected in circuit relation with said third switching means and being responsive to an alternating potential applied to said input terminals to apply a control signal to said third switching means when the alternating potential applied to said input terminals exceeds a predetermined magnitude; said third switching means being connected in circuit relation with said transformer means and said first switching means to energize said first switching means when said third switching means switches to its conductive state in response to a control signal from said second switching means; said first switching means being continuously energized when said third switching means switches during each positive half cycle of an alternating potential applied to said input terminals.

3. A voltage regulator comprising, input terminals adapted for connection to a source of alternating potential; output terminals adapted for connection to a load circuit; transformer means connected in circuit relation with said input and output terminals; relay means having a first position when deenergized and switching to a second position when energized; said relay means being connected to change the circuit connection of said transformer means relative to said output terminals when said relay means switches from one of its positions to the other; trigger means for energizing said relay means when an alternating potential applied to said input terminal exceeds a predetermined magnitude, and for deenergizing said relay means when an alternating potential applied to said input terminals drops below substantially the same predetermined magnitude; said trigger means including glow discharge means and controlled rectifier means; said glow discharge means having the characteristic of switching from a nonconductive state to a conductive state when subjected to an electrical potential of predetermined magnitude; said controlled rectifier means having the characteristic of switching from a nonconductive state to a conductive state during a positive half cycle of alternating potential when a control signal is applied thereto; said glow discharge means being connected in circuit relation with said controlled rectifier means and being responsive to an alternating potential applied to said input terminals to apply a control signal to said controlled rectifier means when the alternating potential exceeds a predetermined magnitude; said controlled rectifier means being connected in circuit relation with said transformer means and said relay means to energize said relay means when said controlled rectifier means switches to its conductive state in response to a control signal from said glow discharge means; said relay means being continuously energized when said controlled rectifier means switches during each positive half cycle of an alternating potential applied to said input terminals.

4. A voltage regulator comprising, a transformer having at least one winding with tap connections thereon; input terminals connected in circuit relation with said transformer adapted for connection to a source of alternating potential; output terminals connected in circuit relation with said transformer adapted for connection to a load circuit; first, second and third switching means; said first switching means having the characteristic of allowing electrical conduction above a predetermined electrical potential; said second switching means being connected in circuit relation with said tapped transformer winding and said first switching means, and having the characteristic of allowing electrical conduction during a positive half cycle of an alternating potential when a control signal is applied thereto; said third switching means being connected in circuit relation with one of the output terminals for switching said output terminal between first and second predetermined tap connections on said tapped transformer winding; said first switching means being connected in circuit relation with said transformer and said second switching means; the switching of said switching means being responsive to the switching of said first switching means; the switching of said first switching means being responsive to the alternating potential on said tapped transformer winding when said input terminals are connected to the source of alternating potential; said first and second switching means switching each positive half cycle of the source of alternating potential when said input terminals are connected thereto and its magnitude is above a predetermined point; said third switching means switching one of said output terminals from the first tap connection to the second tap connection of said transformer winding when said first and second switching means are switched, with said output terminal being maintained on the second tap connection when said first and second switching means are switching each positive half cycle of the source potential; said third switching means switching said output terminal to the first tap connection when the magnitude of the source potential drops below the predetermined point and said first and second switching means stop switching.

5. A voltage regulator comprising, a transformer having at least one winding with a plurality of tap connections thereon; input terminals connected in circuit relation with said transformer for connection to a source of alternating potential; first and second output terminals connected in circuit relation with said transformer for connection to a load circuit; first, second and third switching means; said first switching means having the characteristic of blocking current flow below a predetermined potential and allowing current flow above the predetermined potential; said second switching means having conductive and nonconductive states comprising a controlled rectifier having main electrodes and a control electrode; said third switching means comprising a relay having an electromagnetic coil, a movable contact member and first and second stationary contact positions; the first and second stationary contact positions of said relay being connected in circuit relation with said first output terminal; said first and second stationary contact positions being connected to first and second predetermined tap connections on said transformer winding, respectively; said second switching means, the electromagnetic coil of said relay, and said transformer winding being connected in circuit relation, with said electromagnetic coil being energized for a complete cycle of alternating potential when said controlled rectifier is in its conducting state during a portion of the positive half cycle of an alternating potential; said first switching means being connected in circuit relation with said transformer winding and the control electrode of said controlled rectifier; said first switching means applying a control signal to the control electrode of said controlled rectifier, switching it from its blocking state to its conducting state when said input terminals are connected to the source of alternating potential and the source potential is above a predetermined magnitude; said first switching means applying a control signal to said second switching means each positive half cycle that the source potential exceeds the predetermined magnitude; the movable contact member of said relay being switched from one stationary contact position to the other stationary contact position when said second switching means is switched to its conductive state, and maintaining this position when said second switching means is switching each positive half cycle of the source potential.

6. A step voltage regulator for regulating the magnitude of a source of alternating potential comprising, transformer means having tap connections thereon; first, second and third switching means; said first switching means being connected in circuit relation with said transformer means to switch in response to a predetermined magnitude of the source potential when it is applied to said transformer means; said second switching means switching from a nonconductive to a conductive state when a control signal is applied thereto during a positive half cycle of an alternating potential, and switching back to its nonconductive state at the end of the positive half cycle; said second switching means being connected in circuit relation with said first switching means to receive control signals from said first switching means when said first switching means switches to its conductive state; said third switching means being connected in circuit relation with said second switching means; said third switching means being connected to a first predetermined tap on said transformer means when said second switching means is not switching each positive half cycle of an alternating potential, said third switching means being connected to a second predetermined tap on said transformer means when said second switching means is switching each positive half cycle of an alternating potential.

7. A voltage regulator for regulating a source of alternating potential, comprising transformer means having tap connections thereon; first, second and third switching means; said first switching means being responsive to the source of alternating potential when applied to said transformer means to switch from a nonconductive to a conductive state during each positive half cycle that the source of alternating potential exceeds a predetermined magnitude; said second switching means being responsive to the switching of said first switching means to switch from a nonconductive to a conductive state when said first switching means switches to its conductive condition, and continue in the conductive state until the end of the positive half cycle of the source of alternating potential; said third switching means being connected to a first predetermined tap on said transformer means when deenergized and to a second predetermined tap when energized; said third switching means being responsive to the switching of said second switching means; said third switching means being energized for a complete cycle of the source of alternating potential each time said second switching means switches during a positive half cycle of the source of alternating potential.

8. A step voltage regulator for regulating a source of alternating potential, comprising an auto-transformer having tap connections thereon; a relay for switching taps on said autotransformer; said relay being connected to a first predetermined tap when deenergized and to a second predetermined tap when energized; a controlled rectifier having main electrodes and a control electrode; the main electrodes of said controlled rectifier being connected in circuit relation with said autotransformer and said relay; glow discharge means which switches from a nonconductive to a conductive state in response to a predetermined potential; said glow discharge means being connected to be responsive to the source of alternating potential when it is applied to said autotransformer; energy storage means connected in circuit relation with said glow discharge means; rectifier means connected in circuit relation with said autotransformer, said glow discharge means, and said energy storage means, to apply positive half cycles of the source of alternating potential to said glow discharge means and said energy storage means when the source of alternating potential is applied to said autotransformer; said glow discharge means being connected in circuit relation with the control electrode of said controlled rectifier; said energy storage means discharging through said glow discharge means each time said glow discharge means switches to its conductive state to apply a control signal to said controlled rectifier and switch it to its conductive state; and means keeping said relay energized for at least the major portion of a complete cycle of the source of alternating potential each time said controlled rectifier switches to its conductive state during a positive half cycle of the source of alternating potential.

9. A step voltage regulator for regulating a source of alternating potential comprising, input and output terminals; an autotransformer connected to said input and output terminals having tap connections thereon; a relay having a winding, first and second stationary contact positions, and a movable contact member for switching taps on said autotransformer; said first and second stationary contact positions being connected to first and second predetermined taps, respectively, on said autotransformer, and to one of said output terminals; said movable contact member connecting said output terminal to the first predetermined tap when said relay is deenergized and to the second predetermined tap when said relay is energized; a controlled rectifier having main electrodes and a control electrode; the main electrodes of said controlled rectifier being connected in circuit relation with said autotransformer and the winding of said relay; glow discharge means which has the characteristic of switching from a nonconductive to a conductive state when a predetermined electrical potential is applied thereto; said glow discharge means being connected to be responsive to the source of alternating potential when it is applied to said autotransformer; energy storage means connected in circuit relation with glow discharge means; rectifier means connected in circuit relation with said autotransformer, said glow discharge means and said energy storage means, to apply positive voltage cycles of the source of alternating potential to said glow discharge means and said energy storage means when said source of alternating potential is applied to said input terminals; said glow discharge means being connected in circuit relation with the control electrode of said controlled rectifier; said energy storage means discharging through said glow discharge means each time said glow discharge means switches to its conductive state, to apply a control signal to said controlled rectifier and switch it to its conductive condition; and second rectifier means connected across the winding of said relay to keep said relay energized for a complete cycle of the source of alternating potential each time said controlled rectifier switches to a conductive state during a positive half cycle of the source of alternating potential.

10. A voltage regulator comprising, input terminals for connection to a source of alternating potential; output terminals adapted for connection to a load circuit; transformer means having first and second winding portions; first switching means having a first position when deenergized and a second position when energized; said transformer means, said first switching means, and said input and output terminals being connected in circuit relation; said switching means connecting the first and second winding portions of said transformer means in series with said output terminals when in its first position, and connecting said input terminals directly to said output terminals when in its second position; and trigger means connected in circuit relation with said input terminals and said switching means; said trigger means energizing said switching means when said input terminals are connected to a source of alternating potential whose magnitude exceeds a predetermined value; said trigger means deenergizing said switching means when the source of alternating potential drops below substantially the same predetermined value.

11. A voltage regulator comprising, input terminals for connection to a source of alternating potential; output terminals adapted for connection to a load circuit; transformer means having first and second winding portions; first switching means having a first position when deenergized and a second position when energized; said transformer means, said first switching means, and said input and output terminals being connected in circuit relation; the first position of said first switching means connecting said input terminals across one of said first and second winding portions and connecting the first and second winding portions of said transformer means in series with said output terminals; the second position of said first switching means connecting said input terminals directly to said output terminals; and trigger means connected in circuit relation with said input terminals and said first switching means; said trigger means energizing said first switching means when said input terminals are connected to a source of alternating potential whose magnitude exceeds a predetermined value; said trigger means deenergizing said first switching means when the source of alternating potential drops below substantially the same predetermined magnitude; said trigger means including second and third switching means; said second switching means being connected in circuit relation with said third switching means and being responsive to the source of alternating potential when it is connected to said input terminals, to apply a control signal to said third switching means when the magnitude of the source of potential exceeds a predetermined value; said third switching means being connected in circuit relation with said first switching means and said input terminals to energize said first switching means for at least a complete cycle of the source potential each time said second means applies a control signal to said third switching means during a portion of a cycle of the source potential.

12. A voltage regulator comprising, input terminals adapted for connection to a source of alternating potential; output terminals adapted for connection to a load circuit; transformer means having first and second winding portions; switching means having a first position when deenergized and a second position when energized; said transformer means, said switching means, and said input and output terminals being connected in circuit relation, with said switching means connecting said input terminals across one of said first and second winding portions and connecting said first and second winding portions in series with said output terminals when in its first position, and connecting said input terminals directly to said output terminals when in its second position; and trigger means connected in circuit relation with said input terminals and said switching means; said trigger means energizing said switching means when the input terminals are connected to a source of alternating potential whose magnitude exceeds a predetermined value; said trigger means deenergizing said switching means when the source of alternating potential drops below substantially the same predetermined value; said trigger means including glow discharge means and controlled rectifier means; said glow discharge means being connected in circuit relation with said controlled rectifier means and being responsive to the source of alternating potential when it is connected to said input terminals to apply a control signal to said controlled rectifier during each positive half cycle of the source potential that the source potential exceeds a predetermined magnitude; said controlled rectifier being connected in circuit relation with said input terminals and said switching means to energize said switching means for a predetermined period of time when said glow discharge means applies a control signal to said controlled rectifier during a positive half cycle of the source potential.

13. A voltage regulator comprising, input terminals adapted for connection to a source of alternating potential; output terminals adapted for connection to a load circuit; transformer means having first and second winding portions; relay means having a winding and contacts, said contacts being in a first position when said relay is deenergized and a second position when said relay is energized; said transformer means, said relay means, and said input and output terminals being connected in circuit relation, with said relay means connecting said input terminals accross one of said first and second winding portions and connecting said first and second winding portions in series with said output terminals when said contacts are in the first position, and connecting said input terminals directly to said output terminals when the contacts are in the second position; and trigger means connected in circuit relation with said input terminals and the winding of said relay means; said trigger means energizing the winding of said relay means when the input terminals are connected to a source of alternating potential whose magnitude exceeds a predetermined value; said trigger means deenergizing the winding of said relay means when the source of alternating potential drops below substantially the same predetermined value; said trigger means including glow discharge means and controlled rectifier means; said glow discharge means being connected in circuit relation with said controlled rectifier means and being responsive to the source of alternating potential when it is connected to said input terminals to apply a control signal to said controlled rectifier means during each positive half cycle of the source potential that the source potential exceeds a predetermined magnitude; said controlled rectifier means being connected in circuit relation with said input terminals and the winding of said relay means to energize the winding of said relay means each time said glow discharge means applies a control signal to said controlled rectifier means during the positive half cycle of the source potential, and means connected across the winding of said relay means to energize said winding for at least a complete cycle of said source potential.

14. An electric circuit for energizing the electromagnetic coil of a relay when a source of alternating potential exceeds a predetermined magnitude, and for deenergizing the electromagnetic coil when the source of alternating potential drops below substantially the same predetermined magnitude, comprising a relay having an electromagnetic coil; glow discharge means adapted to be responsive to the magnitude of the source of alternating potential; said glow discharge means switching from a nonconductive condition to a conductive condition during each positive half cycle of the source of alternating potential that the source potential exceeds a predetermined magnitude; energy storage means connected across said glow discharge means, said energy storage means discharging through said glow discharge means each time said glow discharge means switches to its conductive condition, to provide a control signal; controlled rectifier means having main electrodes and a control electrode; said controlled rectifier means being adapted for connection to the source of alternating potential; said controlled rectifier means having its main electrodes connected in circuit relation with the electromagnetic coil of said relay, and its control electrode connected in circuit relation with said glow discharge means; said controlled rectifier means being responsive to the control signal provided by said energy storage means and said glow discharge means to switch from a nonconductive condition to a conductive condition during each positive half cycle of the source potential that it receives a control signal, and connect said electromagnetic coil with a source of alternating potential for the portion of the positive half cycle of the source potential that said controlled rectifier means is conducting; and rectifier means connected across said electromagnetic coil to effectively energize said electromagnetic coil for at least a complete cycle of the source potential each time said electromagnetic coil is connected to the source potential for a portion of a positive half cycle of the source potential.

References Cited
UNITED STATES PATENTS

| | | | |
|---|---|---|---|
| 2,071,984 | 2/1937 | Minneci | 323—43.5 |
| 2,180,164 | 11/1939 | Minneci | 323—43.5 |
| 2,180,193 | 11/1939 | Brand | 323—43.5 |
| 3,182,228 | 5/1965 | Gambill et al. | 317—148.5 |
| 3,239,723 | 3/1966 | Washington et al. | 317—148.5 |
| 3,296,498 | 1/1967 | Chassanoff | 317—148.5 |

JOHN F. COUCH, *Primary Examiner.*

WARREN E. RAY, *Examiner.*